(12) United States Patent
Trantow

(10) Patent No.: US 8,356,067 B2
(45) Date of Patent: Jan. 15, 2013

(54) SERVICING DEVICE AGGREGATES

(75) Inventor: Wayne D. Trantow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 3311 days.

(21) Appl. No.: 10/280,889

(22) Filed: Oct. 24, 2002

(65) Prior Publication Data

US 2004/0083262 A1  Apr. 29, 2004

(51) Int. Cl.
*G06F 15/16* (2006.01)
(52) U.S. Cl. .................... 709/203; 709/226
(58) Field of Classification Search .............. 709/203, 709/223, 224, 225, 226, 228
See application file for complete search history.

(56) References Cited

U.S. PATENT DOCUMENTS

| | | | | |
|---|---|---|---|---|
| 3,226,675 | A * | 12/1965 | Edwards ....................... | 340/467 |
| 5,941,947 | A * | 8/1999 | Brown et al. ................ | 709/225 |
| 6,916,247 | B2 * | 7/2005 | Gatto et al. .................... | 463/42 |
| 6,948,168 | B1 | 9/2005 | Kuprionas | |
| 2002/0143819 | A1 * | 10/2002 | Han et al. ..................... | 707/513 |
| 2003/0065756 | A1 * | 4/2003 | Carrez ......................... | 709/221 |
| 2004/0003033 | A1 * | 1/2004 | Kamen et al. ................. | 709/203 |
| 2004/0030740 | A1 * | 2/2004 | Stelting ......................... | 709/201 |
| 2004/0221001 | A1 * | 11/2004 | Anagol-Subbarao et al. ............................. | 709/203 |

FOREIGN PATENT DOCUMENTS

WO  WO 98/59478  12/1998

OTHER PUBLICATIONS

Chinese Application No. CPEL0352717 1st Office Action dated Sep. 30, 2005.
Chinese Application No. CPEL0352717 2nd Office Action dated Jul. 11, 2007.

* cited by examiner

*Primary Examiner* — Ario Etienne
*Assistant Examiner* — El Hadji Sall
(74) *Attorney, Agent, or Firm* — Blakely, Sokoloff, Taylor & Zafman LLP

(57) ABSTRACT

A constellation is determined in reference to a particular combination of devices and/or software, some or all of which may be coupled with a network. A constellation addresses aggregate capabilities provided by a combination of devices and/or software available on the network. The network may define multiple constellations. Services are written for constellations, and the services may be pulled from external sources for use on the network. A server on the network, such as a service host, may coordinate and manage obtaining services from the external sources, and removing or disabling services for constellations no longer valid.

19 Claims, 4 Drawing Sheets

SERVICING DEVICE AGGREGATES

FIELD OF THE INVENTION

The invention generally relates to providing services to devices, and more particularly to aggregating installed devices to define a virtual device, which may then be provisioned according to the capabilities of the virtual device.

BACKGROUND

Generally, when a device is purchased, such as a computer, audio player, Compact Disc (CD) recorder, etc., certain drivers and/or software is provided to utilize the device. Historically, there has been no way to automatically make use of the combined potential of multiple devices within a particular environment. For example, a user may have, over time, purchased a computer for word processing, a speaker system incident to a game purchase, and a microphone incident to a dictation software purchase. Each of these devices was purchased for a particular purpose, and their associated software is designed for a specific use towards that purpose. However, in theory, these devices, in combination, may be used to implement other devices, such as an Internet telephone, answering system, etc.

Recently, some effort has been made to aggregate existing hardware to present a new device, such as the Internet telephone. Various technologies and protocols are being studied in an effort to build a framework in which such device combinations may be described. For example, the Web Services Description Language (WSDL) may be used to describe service capabilities; Universal Description, Discovery and Integration (UDDI) may be used to enable discovery of networked machines providing certain services (e.g., a services "yellow pages"), Universal Plug and Play (UPNP) may be used to enable identification and facilitate installation of devices attached to a network, etc.

Two particular well-known provisioning services, which may use UPNP or another web service description environment, includes the CableHome™ framework and the Open Service Gateway Initiative (OSGi), both of which are interface specifications defining delivery of services over wide-area networks (WANs) to local area networks (LANs) and devices on the LAN. Unfortunately, while allowing for providing an Internet telephone device as an aggregate of other devices on a LAN, these provisioning services lack flexibility in their ability to provision devices. These services restrict a user on a LAN, such as one connected to the Internet by way of a broadband connection such as a cable modem, XDSL (digital subscriber line) modem, etc., by not involving the user in the provisioning of services that may be applicable to the particular LAN devices. Instead, these provisioning services implement a supervised service "push" framework in which a technician affiliated with the provisioning service is responsible for identifying aggregate abilities that may exist on a LAN, and then pushing/offering services (perhaps exclusively) accordingly.

BRIEF DESCRIPTION OF THE DRAWINGS

The features and advantages of the present invention will become apparent from the following detailed description of the present invention in which.

DETAILED DESCRIPTION

Figure 1:
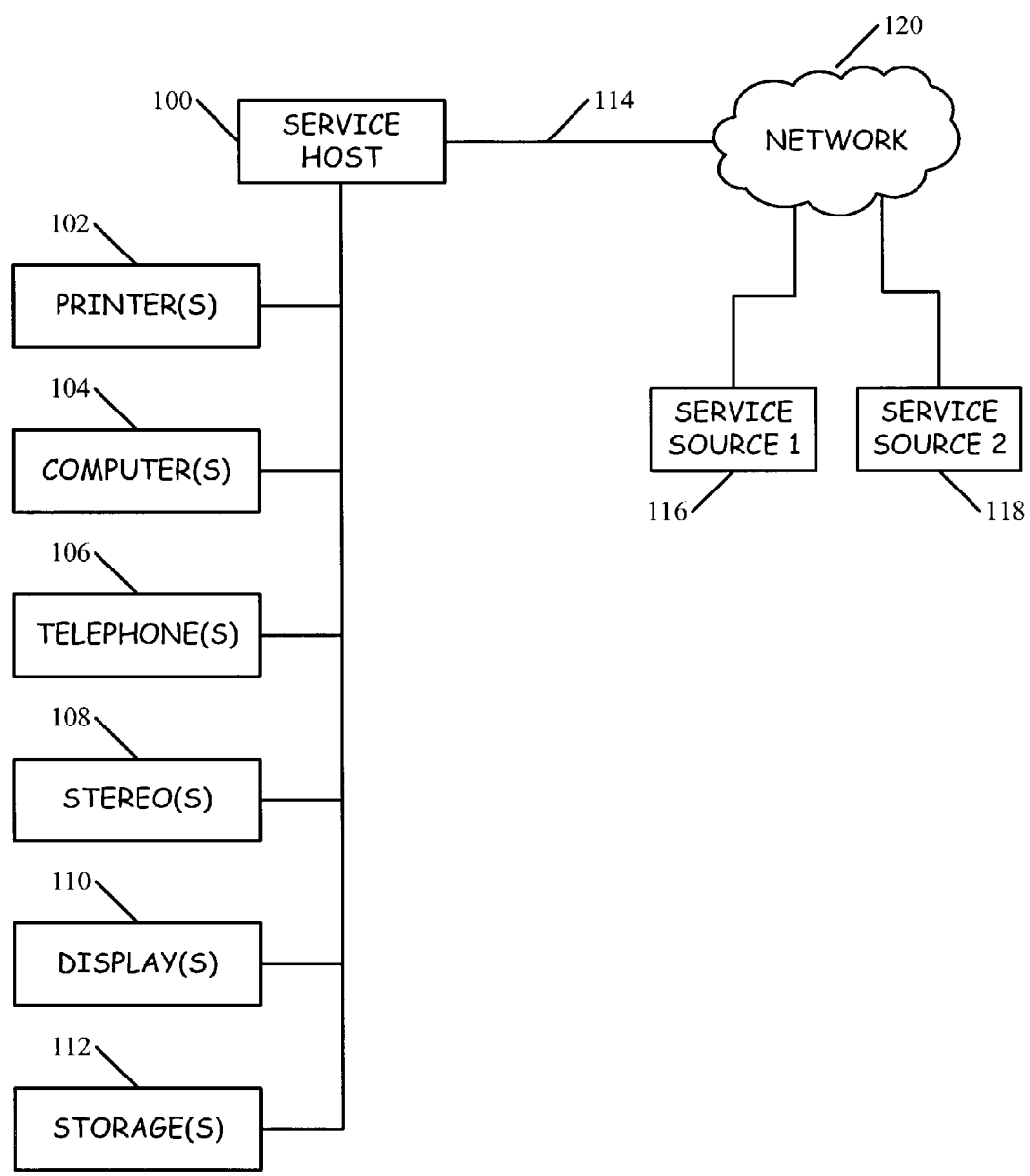
FIG. 1 illustrates an environment in which certain aspects of the invention may be performed.

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as not to obscure the disclosed subject matter.

A local environment including a network, such as a Local Area Network (LAN), may define a "resource matrix" comprised of web services and devices communicatively coupled in some manner, e.g., wired or wirelessly, to the network. A particular combination of devices and services constitutes a logical platform referenced herein as a resource "constellation." A "service" is defined as an operation performed by a service host in conjunction with a resource constellation. The operation of the service is defined by a software program that is packaged and made available to the service host by the service source. A service may provide an interface, resources, etc. and thus become a resource within a constellation for another service, e.g., a service may be built on an aggregation of other services, devices, etc.

As devices, machines, or services are added to the network, new services may be automatically obtained for constellations now definable with respect to the current state of the network. It is assumed that devices are either directly connectable to the network, or may be operated through an interface device. Thus, as one example, if a network environment already included an Internet link, a computer, and speaker system, and then a microphone were later added, this addition would allow defining a constellation which supports an Internet telephone service. Or, as another example, if a networked compact disc (CD) player were added, a constellation supporting a music jukebox service could be implemented.

Traditional service provider environments, such as CableHome or OSGi, operate as a service-push system, where the service provider attempts to track the nature of the local environment and offer/push services accordingly. This is inefficient, and often the information is out of date since the push provider may not be aware of changes to a local environment, e.g., network device additions/deletions. In illustrated embodiments, instead a service-pull system is used where services are pre-written for interfaces of presumed constellations. A service may be automatically pulled to a local environment once a constellation exists with the required infrastructure for the service, e.g., necessary hardware and/or software to support the service. Addition or removal of devices, machines or software from a network can be tracked so that constellations can be defined, suspended, removed, or updated automatically. And, costs may be associated with services, and local rules or policies applied, to determine if and how services may be automatically or manually obtained and utilized in a particular environment. It will be appreciated that advertising may also be targeted to constellations, and that a push and/or pull model may be employed to obtain them. Advertising may be used to sponsor or otherwise support making services available.

For the purposes of the following description and claims, a "service host" refers to a machine, such as a local server on the network, from which services may be obtained, e.g., this machine hosts services which may be provided to devices on the network. It will be appreciated that a service host may dynamically, opportunistically, predictively, etc. obtain services, just links thereto (e.g., a Uniform Resource Locator (URL) or other reference), or some combination thereof, from a "service source," e.g., typically a source external to the network. In the context of a link to a service, access of the link results in the service being obtained from its service source.

FIG. 1 illustrates an environment in which certain aspects of the invention may be performed. Illustrated are various devices, such as a printer 102, computer 104, e.g., a desktop, notebook, personal digital assistant (PDA), etc., telephone 106, stereo 108, display 110, e.g., a television, monitor, projector, liquid crystal display (LCD), etc., and storage 112, e.g., a network accessible mass storage device such as a hard drive. The phrase "resource context" will be used to refer to devices coupled with the server. It will be appreciated that the illustrated devices are for exemplary purposes only and are not intended to limit the invention.

Devices 102-112 are communicatively coupled to a service host 100, e.g., a local or remote server, workstation, desktop computer, Internet gateway or other computing device or machine, by way of a communication channel 114 which may be a combination of wired and/or wireless communication technologies. The service host is coupled with a network 120, such as the Internet, a wide area network (WAN) or other network. As will be discussed further below, the service host is operative to monitor when devices, such as illustrated device 102-112, are added or removed from the communication channel 114. In one embodiment, a service host determines what constellations are defined by available devices. It is assumed software, application programs, drivers, etc. (hereafter "software") have been prepared for presumed constellations, and the service host implements a supervisory pull system in which the service host automatically obtains software for constellations actually present in a resource context.

The service host 100 may be communicatively coupled with service sources 116, 118 which provide the software for various constellations. Although only two service hosts are illustrated, it will be appreciated that an arbitrary number of service hosts may be utilized. Service host 100 may be pre-configured with the identity of the service hosts, or a discovery protocol, such as UDDI, may be used to discover their presence.

It will be appreciated that constellation determination may be a resource and communication bandwidth intensive task beyond the capabilities of the service host 100 and/or its local network 114. Consequently, in another embodiment, a service source (or other external resource), such as one of the illustrated service hosts 116, 118, is responsible for comparing a resource matrix against available services provided by various service sources. In a still further embodiment, to facilitate the comparing, the service source maintains a "catalog" of available services, e.g., in a database, and performs an intersection of the catalog against the resource matrix to identify applicable services.

Figure 2:
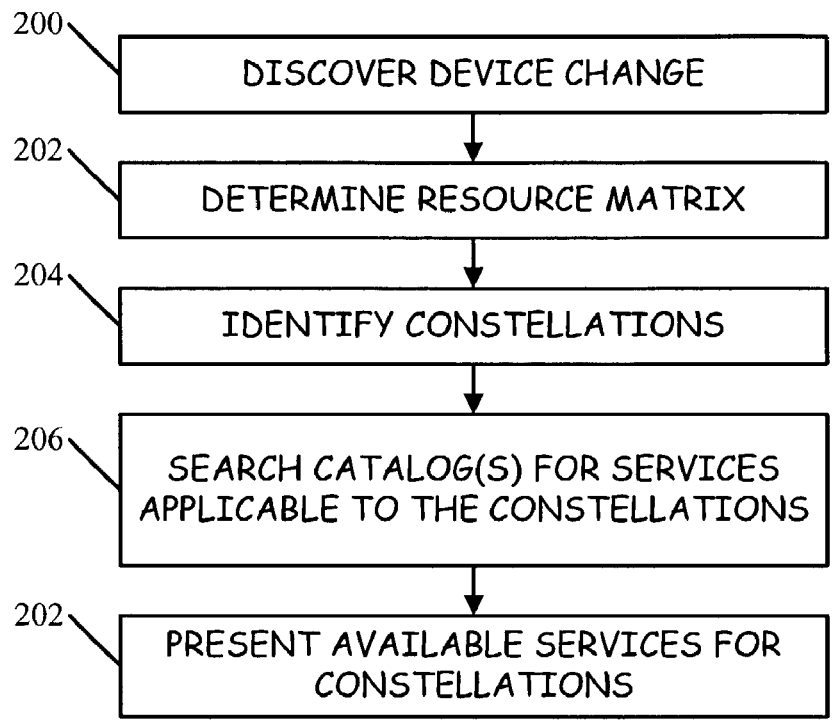
FIG. 2 illustrates a flowchart of exemplary operations for managing devices communicatively coupled to a network.

FIG. 2 illustrates a flowchart of exemplary operations for managing devices communicatively coupled to a network. In one embodiment, the illustrated operations may be performed by a FIG. 1 service host 100. In another embodiment, resource intensive tasks are offloaded to a high-performance device (or even to servers in a peer-to-peer network).

The service host may be configured to perform the illustrated operations continuously, or periodically. When the service host discovers 200 a device change, e.g., such as a power-up event or addition of a device to a resource context, the service host determines 202 a new resource matrix. It will be appreciated that resource matrices may be identified incrementally and retained, such that adding a new device results in identifying only the newly defined matrices.

After determining 202 the new resource matrix, constellations applicable to the resource matrix may be identified 204. It will be appreciated that with sufficient resources, one may skip the operation of identifying constellations, and simply map a resource context against all possible services to see which will operate in a given resource context.

A catalog may be searched 206 for software that is available for the constellations of the resource context. The catalog can be dynamically generated, such as through real-time queries to FIG. 1 service sources 116, 118, and/or the service host may advance query service sources for their service offerings and store results in a local storage, e.g., a database, etc., for later searching/matching. It will be appreciated the service host may catalog services for various constellations, including those not yet seen in a particular resource context. For example, common services, or popular services, may be predictively obtained in advance of an appropriate constellation being present.

In one embodiment, each available service may be presented 206 to a user with an interface allowing inspection and/or selection of the service. It will be appreciated that the service may have access requirements, such as agreeing to licensing terms, arranging for payment for the software, or the like, and that the interface may be configured to prevent access to the software for the service until required terms are met. It will be appreciated that various cryptographic techniques may be employed to prevent tampering with software.

As noted above, resource intensive tasks, such as identifying 204 constellations, and search 206 catalogs for services, may be are offloaded to higher-performance devices that operate on behalf of the service host. For example, in a typical home environment, it is likely the service host will have inferior capabilities in comparison to a service source. Consequently, in one embodiment, a service source operates on behalf of a home network's service host to perform difficult tasks such as constellation identification and mapping against available services. The results of these intensive operations are provided to the service host.

Figure 3:
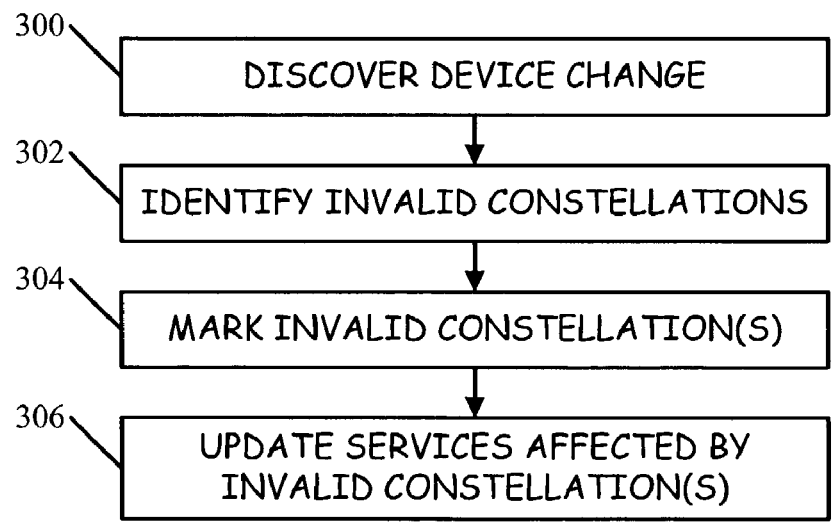
FIG. 3 illustrates a flowchart of exemplary operations performed by the FIG. 1 service host from which managed devices are decoupled.

FIG. 3 illustrates a flowchart of exemplary operations performed by the FIG. 1 service host 100 from which managed devices are decoupled. The service host may be configured to perform the illustrated operations continuously, or periodically, and may operate in conjunction with FIG. 2, or separately.

When the service host discovers 300 a device change, e.g., such as a power-down event or removal of a device from a resource context, currently known constellations for the resource context are inspected to determine 302 which contexts, if any, have been invalidated by the device removal. It will be appreciated that invalid contexts may be deleted from storage, or simply marked as unavailable.

Assuming an invalid constellation is marked 304 as being unavailable, the services associated with the now-invalid constellation are appropriately updated 306. For example, if a now-invalid service had a monthly fee, in one embodiment, the service host providing the service may be notified that charges should be suspended while the service is unavailable. Alternatively, updating 306 may be, or may include, displaying a dialog box or user-interface allowing a user to determine what action to take with respect to now-invalid services.

Figure 4:
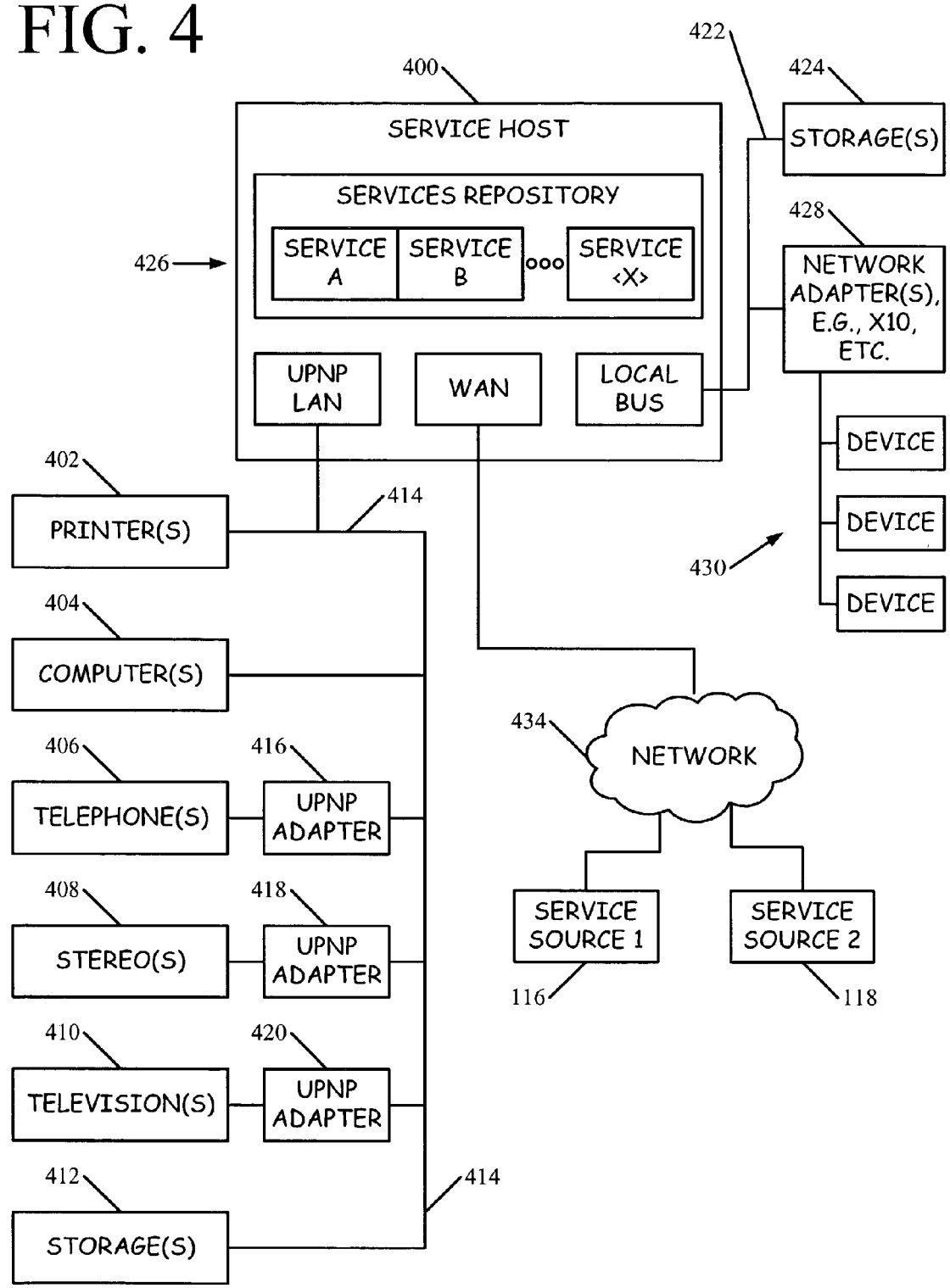
FIG. 4 illustrates a high-level view of a home network according to one embodiment.

FIG. 4 illustrates a high-level view of a home network according to one embodiment. The FIG. 4 embodiment is a detailed variation of the FIG. 1 embodiment. Illustrated are various devices, such as a printer 402, computer 404, telephone 406, stereo 408, television 410, and storage 412. It will be appreciated that the illustrated devices are for exemplary purposes only and are not intended to limit the invention.

Devices 402-412 are communicatively coupled to a service host 400 by way of a communication channel 414, which may be a combination of different wired and/or wireless communication technologies. In the illustrated embodiment, devices unable to directly communicate over the channel 414, such as telephone 406, stereo 408, television 410, etc., may be coupled to the channel by way of an adapter 416-420. In the illustrated embodiment, it is assumed that the communication channel 414 is a network, such as a Transmission Control Protocol/Internet Protocol (TCP/IP) based network, and that a discovery protocol, such as Universal Plug and Play (UPNP), is utilized to track addition and removal of devices from a hardware context. Thus, as illustrated, adapters 416-420 include UPNP adapters that identify the presence of, and integrate communication with, the devices in the resource context.

The service host may also have a local bus 422, e.g., a Universal Serial Bus (USB), Personal Computer Memory Card International Association (PCMCIA) or PC-CARD bus, or the like, to which may be attached devices (not illustrated) local to the service host. The local bus may also support attached storage 424, such as a large hard disk, for storing services 426 and related data. The local bus may also include local network adapters 428, such as specialized interfaces built-in to the service host to support communication with various types of devices 430, such as devices using the X10 protocol or equivalent operating over a power-line network, e.g., home electrical wiring.

The service host may be communicatively coupled, at least intermittently, to a network 434, such as the Internet, a wide area network (WAN), broadband network, or other network. In the illustrated embodiment, the service host 400 monitors UPNP events to identify when devices, such as illustrated devices 402-412, are added or removed from communication channel 414. In the illustrated embodiment, the service sources 116, 118 are configured to determine what constellations are defined by the current resource context, e.g., based on which devices are presently available. As discussed above, the service host may implement a supervisory pull system in which the service host automatically obtains from service sources 116, 118 drivers, software, etc. which may be contained within service packages for constellations applicable to the resource context. Acquired services, e.g., services 426, are associated with the service host for later use in various resource contexts.

To demonstrate exemplary operation of the illustrated embodiment, consider an end-user who had a UPNP IP Telephone Adapter 416, a UPNP Audio Adapter, 418, speakers operative in several rooms, and later added storage device 412, such as a UPNP Media Storage Sever or other device capable of being instructed by other UPNP devices to store and retrieve data when needed. The storage 412 and adapters 416, 418 correspond to one logical constellation defined in the context of the illustrated network. As discussed above, whenever a new device is added to the home network, the service host 400 discovers it and adds the device information the resource context. It will be appreciated that various database technology may be employed by the service host to track resource contexts.

When a user adds storage 412 to the home network, in one embodiment, the service host 400 makes a Web Service invocation to the service source, such as a Simple Object Access Protocol (SOAP) message with input arguments describing the resource matrix, which could include all the UPNP devices in the network, all Web Services the user subscribes to, configuration details of the service host, e.g., software libraries devices local to the service host, and other resources. It will be appreciated that various resource description languages may be used to describe the resource matrix. For example, RDF (Resource Description Framework), an XML-based framework for describing resources, could be used to describe the resource matrix, and be sent as a single XML document argument in the SOAP call. It will be appreciated that other document structures defined by a future XML Schema may be used, e.g., in accord with new document standards. It will also be appreciated that SOAP is identified for exemplary purposes only, and that other technologies may be used to transport a current resource context.

In one embodiment, also identified are services which may be used as resources for other services, e.g., to allow aggregating a service into another service. The Web Service function identified in the SOAP message is received by the service source (or another device acting as a broker for the home network), and when processed (e.g., executed, interpreted, etc.) results in the service source searching through all of the cataloged services of known service sources (e.g., services offered by service sources 116, 118. In one embodiment, the infrastructure between the service host and service sources is based upon Web Services, i.e., extensible Markup Language (XML) based technologies including WSDL, SOAP, and UDDI.

Published operating requirements of different services are compared against the resource context of the home network. It will be appreciated that there may be thousands of cataloged services located on many networked service sources. Matching resource contexts against potentially applicable services may be a resource intensive task. Thus, in one embodiment, specialized intermediaries (e.g., service cataloging agents or service brokers) offload matching operations of the service host. When a match is found, the service information is extracted and saved to a list. In one embodiment, only new or updated services are saved to the list. When all available services have been inspected, a SOAP response including the list may be returned to the service host. The service host may then notify a user of the available services through a user interface, such as by way of a web browser directed towards a web server of the service host, email, or other notification technique.

Thus, for example, the user may receive notification that a Telephone Answering Machine (TAM) service is available for a resource constellation comprised of the telephone 406, storage 412, which the service could use to store outgoing and incoming messages, and stereo 408 which the service could use to play received messages to the user. The user may choose a particular service based on various considerations, including price and performance considerations, as well as the nature of the equipment in the identified constellation. It will be appreciated that various techniques, including a conventional telephone call to a support center, or an online commerce transaction, may be used to allow the user to select a service and satisfy payment requirements or other requirements.

Assume the user is able to use a web browser to purchase the service, and then receive an authorization certificate. This certificate can be given to the service host along with an instruction to install the purchased service. If the software for the service has not already been obtained, the service host can download it from its service source. In one embodiment, the service host gives the certificate to the service source to prove authorization of the service host to obtain a copy of the software. The user now may use the acquired Telephone Answering Machine.

In one embodiment, a service, such as the TAM service, may provide multiple interfaces. For example, the TAM may provide a user interface for a user of the TAM, and a programmatic interface described by a WSDL. A service host could thus host a Web Service locally that other local services could access via local SOAP invocations, or over the WAN, e.g., the service host may operate as a service source for the TAM service. Thus, for example, an end-user could access the home TAM from work via an appropriate control program operating over the WAN.

Figure 5:
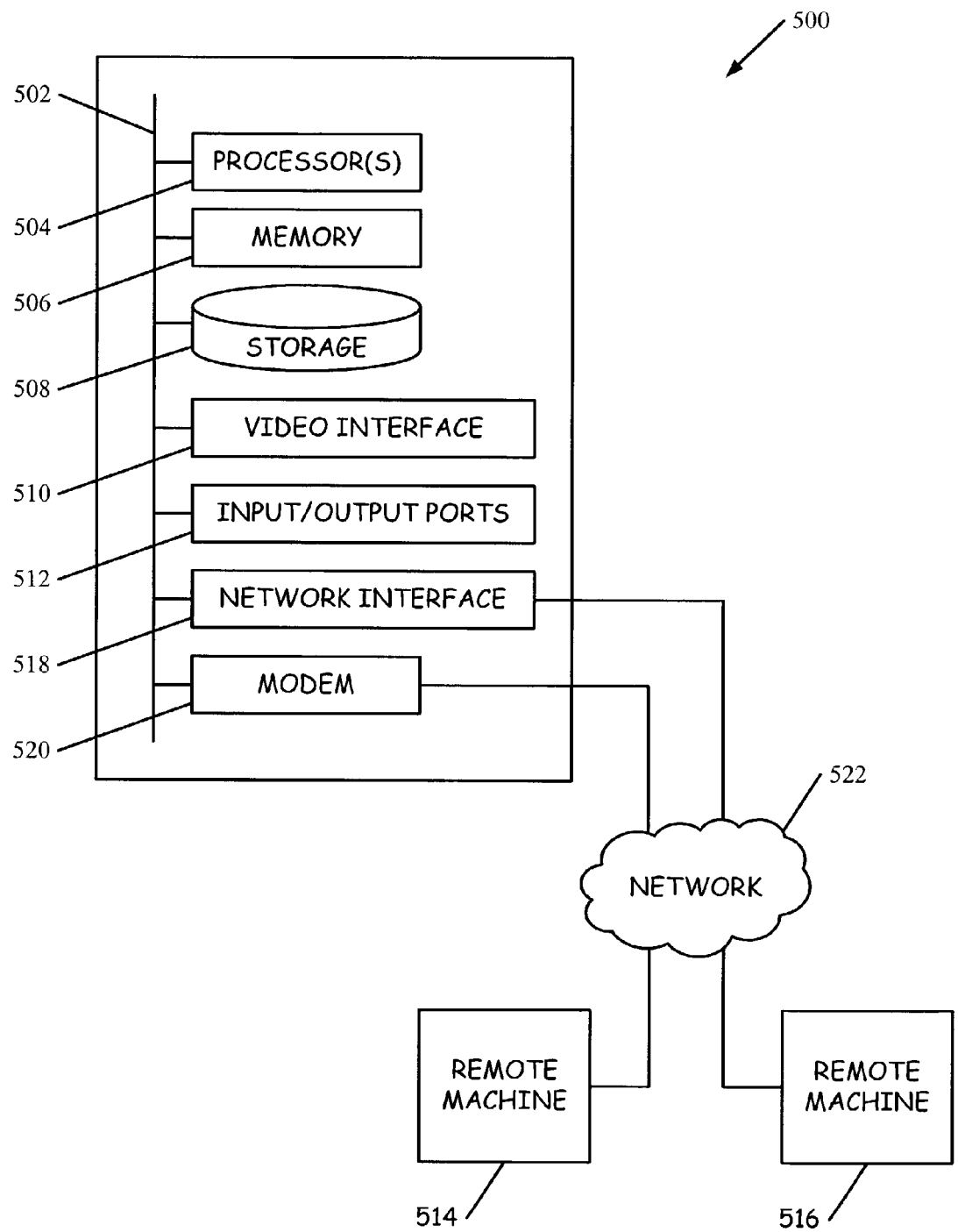
FIG. 5 illustrates a suitable computing environment in which certain aspects of the invention may be implemented.

FIG. 5 and the following discussion are intended to provide a brief, general description of a suitable machine in which certain aspects of the illustrated invention may be implemented. As used herein, the term "machine" includes a single machine, such as a computer, handheld device, transportation device, etc., or a system of communicatively coupled machines or devices.

Typically, a machine 500 includes a system bus 502 to which is attached processors 504, a memory 506, e.g., random access memory (RAM), read-only memory (ROM), or other state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize connections to one or more remote machines 514, 516, such as through a network interface 518, modem 520, or other communicative coupling. Machines may be interconnected by way of a physical and/or logical network 522, such as the network 120 of FIG. 1. One skilled in the art will appreciate that network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and their associated storage media, including hard-drives, floppy-disks, optical storage, tapes, flash memory, memory sticks, digital video disks, biological storage, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multiprocessor machines, portable computers, handheld devices, e.g., Personal Digital Assistants (PDAs), cellular telephones, tablets, etc.

Thus, for example, with respect to the illustrated embodiments, assuming machine 500 embodies the service host 100 of FIG. 1, then remote machines 514, 516 may respectively be two service sources (see, e.g., FIG. 1 service sources 116, 118) providing services to the service host 100. It will be appreciated that remote machines 514, 516 may be configured like machine 500, and therefore include many or all of the elements discussed for machine. It will be appreciated that the service host may optionally be configured to operate as a service control proxy for local control devices on its network, such as handheld devices, where services may be viewed and executed by the local control devices even though they do not actually contain the service itself. That is, a local control device may operate as a front-end providing a convenient mobile user interface, while the service host operates as a back-end where services are actually hosted and managed.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for a service source to provision resources communicatively coupled with a first network, said resources including devices or web services associated with an environment, the method comprising:
   receiving from a service host a resource context for the environment constellation of resources;
   accessing service descriptions of services offered by the service source as well as services offered by other service sources communicatively coupled with the service source;
   mapping the resource context against the accessed service descriptions to determine at least one service operable on selected ones of the resources in the resource context, said selected ones corresponding to a constellation; and
   providing an identification of the at least one determined service to the service host.

2. The method of claim 1, wherein the resource context is received over a second network different from the first network.

3. The method of claim 1, wherein the resource context is determined based at least in part on a monitoring of communicative couplings of machines to the network.

4. The method of claim 1, wherein accessing service descriptions of services offered by the service sources comprises:
   cataloging, prior to receiving the resource context, services provided by the service sources.

5. The method of claim 1, wherein accessing service descriptions of services offered by the service hosts sources comprises:

cataloging services provided by the service sources.

6. The method of claim 1, further comprising:
responsive to receiving the resource context, querying a service catalog for descriptions of services currently offered by the service sources.

7. The method of claim 1, further comprising:
receiving a request to use the determined service; and
facilitating access to program code required to use the determined service.

8. The method of claim 7, wherein facilitating access to program code comprises a selected one of:
providing a Uniform Resource Locator (URL) to the program code; or
providing a Web Service URI (Uniform Resource Identifier) for accessing and downloading the program code.

9. The method of claim 7, wherein facilitating access to program code comprises:
copying the program code from a storage containing the determined service; and
sending the program code to the service host.

10. The method of claim 1, further comprising:
charging the service host a fee associated with the determined service.

11. A non-transitory computer-readable storage medium storing data thereon for a service source to provision resources communicatively coupled with a first network, said resources including devices or web services associated with an environment, wherein the data, when accessed, results in a machine performing:
receiving from a service host a resource context for the environment;
accessing service descriptions of services offered by the service source as well as services offered by service cataloging agents or brokers representing sources communicatively coupled with the service source;
mapping the resource context against the accessed service descriptions to determine at least one service operable on selected ones of the resources, said selected resources corresponding to a constellation; and
providing an identification of the at least one determined service to the source.

12. The non-transitory computer readable storage medium of claim 11 further including data which, when accessed, results in the machine performing:
receiving the resource context over a second network different from the first network.

13. The non-transitory computer readable storage medium of claim 11 further including data which, when accessed, results in the machine performing:
determining the resource context based at least in part on a monitoring of communicative couplings of machines to the network.

14. The non-transitory computer readable storage medium of claim 11 wherein the data for accessing service descriptions of services offered by the service sources further includes data which, when accessed, results in the machine performing:
cataloging, prior to receiving the resource context, services provided by the service sources.

15. The non-transitory computer readable storage medium of claim 11 further including data which, when accessed, results in the machine performing:
cataloging services provided by the service sources.

16. The non-transitory computer readable storage medium of claim 11 further including data which, when accessed, results in the machine performing:
responsive to receiving the resource context, querying the service sources for descriptions of services currently offered by the service sources.

17. The non-transitory computer readable storage medium of claim 11 further including data which, when accessed, results in the machine performing:
receiving a request to use the determined service; and
facilitating access to program code required to use the determined service.

18. The non-transitory computer readable storage medium of claim 17, wherein the data for facilitating access to the program further includes data which, when accessed, results in the machine performing:
providing a Uniform Resource Locator (URL) to the program code.

19. The non-transitory computer readable storage medium of claim 11 further including data which, when accessed, results in the machine performing:
charging the source a fee associated with the determined service.

* * * * *